United States Patent [19]

Moissonnier et al.

[11] 4,165,306
[45] Aug. 21, 1979

[54] MASS-DYEING OF POLYESTER WITH ANTHRAQUINONE AND BENZANTHRONE DYES

[75] Inventors: Rene Moissonnier, Rixheim, France; Hans Seiler, Bubendorf, Switzerland

[73] Assignee: Sandoz Ltd., Basel, Switzerland

[21] Appl. No.: 735,798

[22] Filed: Oct. 26, 1976

[30] Foreign Application Priority Data

Oct. 28, 1975 [CH] Switzerland ............... 13937/75

[51] Int. Cl.² .................................... C08K 5/18
[52] U.S. Cl. ........................... 260/40 P; 260/356; 260/376; 260/381
[58] Field of Search .............. 260/40 P, 376, 356, 260/381

[56] References Cited

U.S. PATENT DOCUMENTS

| | | | |
|---|---|---|---|
| 1,877,791 | 9/1932 | Bayer | 260/368 |
| 2,556,971 | 6/1951 | Moergeli | 260/376 X |
| 2,571,319 | 10/1951 | Waters et al. | 260/40 P X |
| 2,685,591 | 8/1954 | Jenny et al. | 260/381 X |
| 3,530,151 | 9/1970 | Hoare | 260/356 X |
| 3,720,693 | 3/1973 | Peters et al. | 260/40 P X |
| 3,939,113 | 2/1976 | Wick et al. | 260/40 P |

FOREIGN PATENT DOCUMENTS

1045564  10/1966  United Kingdom.

*Primary Examiner*—Sandra M. Person
*Attorney, Agent, or Firm*—Gerald D. Sharkin; Richard E. Vila; Thomas C. Doyle

[57] ABSTRACT

Disclosed is mass-dyed linear, saturated, aromatic polyester comprising, as dyestuff, a compound or mixture of compounds selected from those of formulae I and II,

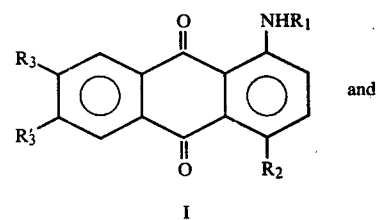

I

-continued

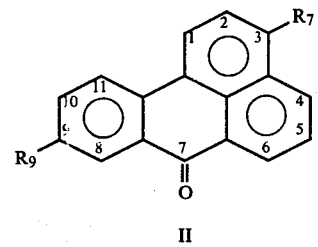

II wherein
$R_1$ is a radical of formula

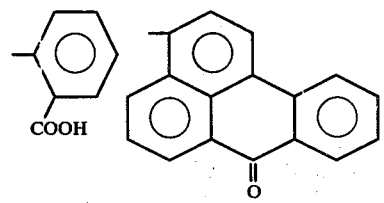

(1)  (2)

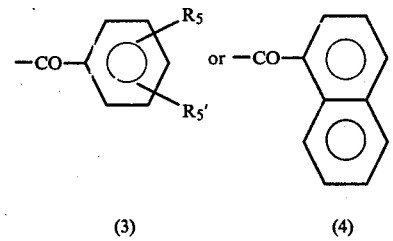

(3)  (4)

$R_2$ is hydrogen or a radical of formula

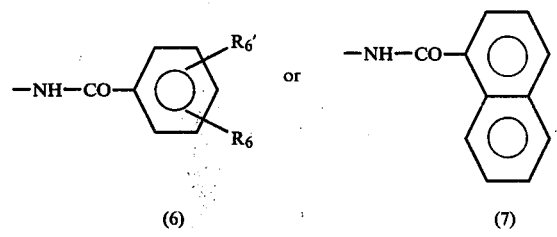

(6)  (7)

of $R_3$ and $R_3'$, both are hydrogen, or one is hydrogen and the other chlorine or bromine, or both are chlorine or bromine,
$R_5$ is hydrogen, chlorine, bromine or methyl,
$R_5'$ is hydrogen, chlorine, bromine, nitro or a 4-phenyl, 4-chlorophenyl, 4-bromophenyl or 4-paranitrophenyl group,
$R_6$ is hydrogen, chlorine or bromine
$R_6'$ is hydrogen, chlorine, bromine or methyl, and
$R_7$ and $R_9$ are the same and are chlorine or bromine, with the provisos
(i) $R_2$ is hydrogen when $R_1$ is a radical (1) or (2) or when $R_1$ is a radical (3), in which $R_5$ is phenyl or chloro-, bromo- or nitro-phenyl,
(ii) $R_3$ and $R_3'$ are both hydrogen when $R_1$ is a radical
(iii) $R_5$ is hydrogen when $R_5'$ is phenyl or chloro-, bromo- or nitro-phenyl, and
(iv) $R_5$ and $R_5'$ are both hydrogen only when $R_2$ is other than hydrogen.

10 Claims, No Drawings

MASS-DYEING OF POLYESTER WITH ANTHRAQUINONE AND BENZANTHRONE DYES

The invention relates to mass-dyed polyester.

The invention provides mass-dyed linear, saturated, aromatic polyester comprising, as dyestuff, a compound or mixture of compounds selected from those of formulae I and II,

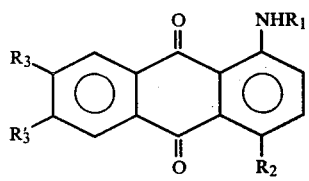

I

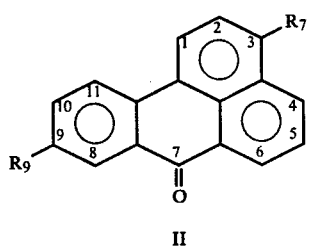

II wherein
$R_1$ is a radical of formula

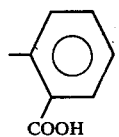

(1)

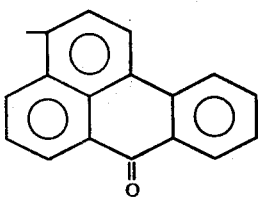

(2)

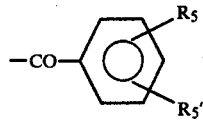

(3)

(4)

$R_2$ is hydrogen or a radical of formula

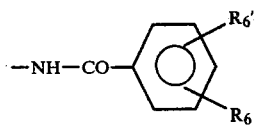

(6)

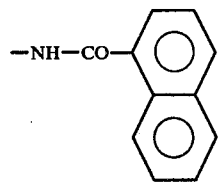

(7)

of $R_3$ and $R_3'$, both are hydrogen, or one is hydrogen and the other chlorine or bromine, or both are chlorine or bromine, $R_5$ is hydrogen, chlorine, bromine or methyl $R_5'$ is hydrogen, chlorine, bromine, nitro or a 4-phenyl, 4-chlorophenyl, 4-bromophenyl or 4-para-nitrophenyl group, $R_6$ is hydrogen, chlorine or bromine $R_6'$ is hydrogen, chlorine, bromine or methyl, and $R_7$ and $R_9$ are the same and are chlorine or bromine, and with the provisos (i) $R_2$ is hydrogen when $R_1$ is a radical (1) or (2) or when $R_1$ is a radical (3), in which $R_5$ is phenyl or chloro-, bromo- or nitro-phenyl, (ii) $R_3$ and $R_3'$ are both hydrogen when $R_1$ is a radical (1), (3) or (4), (iii) $R_5$ is hydrogen when $R_5'$ is phenyl or chloro-, bromo- or nitro-phenyl, and (iv) $R_5$ and $R_5'$ are both hydrogen only when $R_2$ is other than hydrogen.

In the compounds of formula I, when $R_1$ is a radical of formula (3), the following preferences, independently, apply:

(a) of the unsubstituted or substituted phenyls as $R_5'$, the 4-phenyl and 4-para-nitrophenyl are preferred, (b) where $R_5$ is methyl, $R_5'$ is preferably hydrogen, (c) where $R_5$ and/or $R_5'$ are chlorine or bromine, such are preferably in the 2- and/or 4-positions of the phenyl ring, and of chlorine and bromine, chlorine is preferred, (d) where $R_5'$ is nitro, it is preferably in the 4-position of the phenyl ring and preferably $R_5$ is hydrogen or chlorine in the 2-position of said ring, (e) $R_2$ is preferably hydrogen or a radical (6), in which the radical

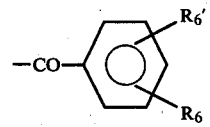

is identical to the radical of formula (3),

When $R_1$ is a radical of formula (4), $R_2$ is preferably hydrogen or the radical of formula (7).

When $R_1$ is a radical of formula (2), $R_3$ and $R_3'$ are preferably either both hydrogen or both chlorine.

In the compounds of formula I, $R_1$ is preferably a radical (2) or (3).

In the compounds of formula II, $R_7$ and $R_9$ are both preferably bromine.

The preferred mass-dyed polyester provided by the invention comprises, a dyestuff, a compound or mixture of compounds selected from the following:-

1-(4'-phenyl-benzoylamino)-anthraquinone (yellow)

1-(4'-para-nitrophenyl-benzoylamino)-anthraquinone (yellow)

1,4-di-benzoylamino-anthraquinone, (yellowish red)

1,4-bis-(2'-,3'- or 4'-methyl-benzoylamino)-anthraquinone, (yellowish red)

1-(2'-chloro-4'-nitrobenzoylamino)-anthraquinone, (Yellow)

1-(4'-nitrobenzoylamino)-anthraquinone, (yellow)

1-(2'- or 4'-chlorobenzoylamino)-anthraquinone, (yellow)

1-(2'- or 4'-methylbenzoylamino)-anthraquinone, (yellow)

1-(2',4'-dichlorobenzoylamino)-anthraquinone, (yellow)

1,4-bis-(2'- or 4'-chlorobenzoylamino)-anthraquinone, (yellowish red)

1,4-bis-(2',4'-dichlorobenzoylamino)-anthraquinone, (yellowish red)
1-anthranilido-anthraquinone (bluish red)
1-(1'-naphthoylamino)-anthraquinone, (reddish yellow)
1,4-bis-(1'-naphthoylamino)-anthraquinone, (yellowish red)
3,9-dibromobenzanthrone, (yellow)
1-(benzanthronyl-3'-amino)-anthraquinone, (brown) and
1-(benzanthronyl-3'-amino)-6,7-dichloroanthraquinone (brown).

The colours of the mass-dyed polyester when following Example 1 hereinafter given are shown beside the respective dyestuffs.

The most preferred mass-dyed polyester provided by the invention comprises, as dyestuff, a compound or mixture of compounds selected from
1-(4'-phenyl-benozylamino)-anthraquinone,
1-(4'-para-nitrophenyl-benzoylamino)-anthraquinone,
1-(benzanthronyl-3'-amino)-anthraquinone, and
1-(benzanthronyl-3'-amino)-6,7-dichloro-anthraquinone.

The polyester, itself, is preferably linear, highmolecular weight, saturated, aromatic polyester and especially that produced by polycondensation of terephthalic acid and, optionally, isophthalic acid, with ethylene glycol and/or cyclohexanediol. Typically, it is the polyester employed in the textile industry.

The mass-dyeing is suitably carried out in conventional manner, the compounds of formula I or II, alone, in mixture one with another and, if desired, in admixture with one or more other dyes indicated for the mass-dyeing of polyester, suitably having being purified and ground in conventional manner prior to their incorporation.

The preferred method of producing the preferred high molecular weight, mass-dyed polyester according to the invention is first to mix the dyestuff(s) with a relatively low-melting, linear, aromatic polyester, typically having a melting point in the range from 75° C. to 230° C. and a softening point in the range of 60° to 80° C. to form a concentrate or so-called "master-batch" containing generally 30 to 60% by weight of dyestuff, and then adding this master-batch in molten form, in the desired amount, depending on the depth of colour required in the final polyester, to the molten high molecular weight polyester, and distributing the dyestuff throughout the melt.

The mixing of the dyestuff(s) with low-melting polyester is suitably effected at low temperature, e.g. employing dry ice as coolant, and grinding them together to form a fine powder and, optionally, processing the powder through an extruder and forming chippings or a granulate from the extrudate.

After addition of the master-batch, whether in powder, chippings or granulate form, to the high molecular weight polyester, the resulting mix can be formed into shaped articles, such as films, foils, fibres or filaments, in conventional manner, e.g. by extrusion or spinning techniques, and such articles further processed, e.g. into yarn, cord, rope, woven, non-woven and knitted goods, or the mix can be formed into granules or chippings for subsequent melting and formation into such shaped articles.

The compounds:
1-(4'-phenylbenzoylamino)-anthraquinone,
1-(benzanthronyl-3'-amino)-anthraquinone and
1-(benzanthronyl-3'-amino)-6,7-dichloroanthraquinone, as well as being employable for the mass-dyeing of polyester by the method described above, can also be incorporated in the polyester by co-condensation with the polymer precursors. Such co-densation may be carried out in conventional manner employing varying amounts of the compounds depending on the depth of shade desired.

The mass-dyed polyester according to the invention has good allround fastness properties, e.g. to light, migration, gas-fumes, ozone and sublimation, as well as good wet fastness. Of particular interest, however, is the fact that the compounds of formulae I and II show very good resistance to the extreme conditions employed in extrusion and especially spinning operations performed to produce shaped articles.

The compounds of formulae I and II are known compounds or may be produced from available starting materials in analogous manner to the known compounds. The compounds which are known are known either as vat-dyes or as intermediates for dyes, especially for acid dyes.

The following Examples, in which all parts and percentages are by weight and all temperatures in degrees centigrade illustrate the invention.

EXAMPLE 1

1000 Parts of a commercial linear copolyester, formed by co-condensation of terephthalic acid, isophthalic acid, ethylene glycol and neopentyl glycol, and having a molecular weight of between 18,000 and 20,000, a melting range of between 90° and 150°, and softening point of 65°, are ground to a powder together with 1000 parts of dry ice in a pin mill which has been cooled to about −30° with dry ice, and the polyester particles then have a diameter of between 300 and 600μ. This polyester powder is mixed well at room temperature in a closed mixer with 500 parts of the finely ground dyestuff of formula 1-(4'-phenyl-benzoylamino)-anthraquinone, and this is subsequently processed in an extruder at 130° to form a cable which is then cut to a granulate.

The dyestuff concentrate, produced as described above, is melted in the shunt current of a helical spinning machine and is added at 270–275° by a metering device to commercial, linear, aromatic polyester (polyethylene terephthalate) in the primary current of the spinning machine. The metering device adds to the polyester current 1 part of dyestuff concentrate per 48 parts of polyethylene terephthalate. The mixture is then spun at 270°–275° at a winding off speed of 200 meters per minute, the spun fibres are stretched at 90° in a drawing machine in the ratio of 1:4, and are twisted in the usual manner in a ring twister. A yellow mass-dyed yarn is thus obtained with good fastness properties.

Following the above procedure but replacing the dyestuff used therein with a dyestuff from the list hereinbefore given, there are obtained mass-dyed yarns of the colours indicated beside the listed dyes.

EXAMPLE 2

1360 Parts of ethylene glycol and 1700 parts dimethyl terephthalate were stirred with 0.55 parts of manganese acetate for 3½ hours at 180° and the methanol produced was distilled off.

The mass is then transferred to a vacuum container suitable for polycondensation and a mixture of 80 parts of ethylene glycol, 0.45 parts of antimony trioxide, 20 parts of tri-nonyl phenyl phosphite and 17 parts of the dyestuff 1-(benzanthronyl-3'-amino)-anthraquinone (in powder form) added thereto. The vacuum was successively increased to > 1 Torr. at 275°, until the intrinsic viscosity of $\eta = 0.70$ is reached by distillation of ethylene glycol.

The dyed polyester obtained is then extruded into water to cool and is granulated. The granules are vacuum dried at 140° for 16 hours and finally spun, stretched and twined as described in Example 1. A brown yarn is obtained.

Following the above procedure but replacing therein the 1-(benzanthronyl-3'-amino)-anthraquinone with 1-(4'-phenyl-benzoylamino)-anthraquinone or 1-(benzanthronyl-3'-amino)-6,7-dichloroanthraquinone, similar yarns are obtained, being yellow or brown, respectively.

What is claimed is:

1. Mass-dyed linear, saturated, aromatic polyester, comprising, as dyestuff, a compound or mixture of compounds selected from
   1-(4'-phenyl-benzoylamino)-anthraquinone,
   1-(4'-para-nitrophenyl-benzoylamino)-anthraquinone,
   1-(benzanthronyl-3'-amino)-anthraquinone, and
   1-(benzanthronyl-3'-amino)-6,7-dichloro-anthraquinone.

2. Mass-dyed polyester according to claim 1, comprising, as dyestuff, 1-(benzanthronyl-3'-amino)-anthraquinone.

3. Mass-dyed polyester according to claim 1, comprising, as dyestuff, 1-(benzanthronyl-3'-amino)-6,7-dichloro-anthraquinone.

4. A process for producing mass-dyed polyester according to claim 1, comprising incorporating in the polyester a compound or mixture of compounds selected from the compounds stated in claim 1.

5. A process according to claim 4, wherein said compound or mixture of compounds is first mixed with a relatively low-melting, linear, aromatic polyester and wherein the mix so-formed is added, in molten form, to molten high-molecular weight polyester, said compound or mixture of compounds being distributed throughout the melt.

6. A process according to claim 4, wherein the compound is 1-(4'-phenylbenzoylamino)-anthraquinone, 1-(benzanthronyl-3'-amino)-anthraquinone or 1-(benzthronyl-3'-amino)-6,7-dichloroanthraquinone, said compound being incorporated by co-condensation with the polyester precursors.

7. Mass dyed linear, saturated aromatic polyester produced by (1) mixing with a melt of the polyester a dyestuff selected from the group consisting of
   (a) 1-(4'-phenyl-benzoylamine)-anthraquinone,
   (b) 1-(4'-para-nitrophenyl-benzoylamine)-anthraquinone,
   (c) 1-(benzanthronyl-3'-amine)-anthraquinone, and
   (d) 1-(benzanthronyl-3'-amine)-6,7-dichloroanthrqquinone and mixtures thereof
or (2) condensing precursors of the polyester in the presence of one or more of dyes a), c) and d).

8. Mass-dyed polyester according to claim 7, comprising, as dyestuff, 1-(4'-phenylbenzoylamino)-anthraquinone.

9. Mass-dyed polyester according to claim 7, comprising, as dyestuff, 1-(4'-para-nitrophenyl-benzoylamino)-anthraquinone.

10. Mass-dyed polyester according to claim 7, having been shaped by extrusion or spinning techniques.

* * * * *